United States Patent [19]
Walther

[11] 3,844,620
[45] Oct. 29, 1974

[54] DUAL RIM SPACER

[75] Inventor: William Dean Walther, Dayton, Ohio

[73] Assignee: Dayton-Walther Corporation, Dayton, Ohio

[22] Filed: Jan. 25, 1974

[21] Appl. No.: 436,472

[52] U.S. Cl............................ 301/13 SM, 301/13 R
[51] Int. Cl.............................................. B60b 11/06
[58] Field of Search ............ 301/13 R, 13 SM, 36 R

[56] References Cited
UNITED STATES PATENTS

| 2,100,626 | 11/1937 | Brink | 301/13 R |
| 3,143,376 | 8/1964 | DiFederico | 301/13 SM |
| 3,486,798 | 12/1969 | Lewis | 301/13 R |

*Primary Examiner*—Robert S. Ward, Jr.
*Assistant Examiner*—Reinhard J. Eisenzopf
*Attorney, Agent, or Firm*—Mack D. Cook, II

[57] ABSTRACT

A non-compressible spacer for use in mounting dual rims on a wheel. Spacer has an annular medial portion with radially outwardly directed uniformly spaced undulations. The undulations are marquise-shaped areas alternating with apexly opposed cone-shaped areas. The ends of the marquise-shaped areas and the space between the cone-shaped areas seat on the wheel felloe.

2 Claims, 9 Drawing Figures

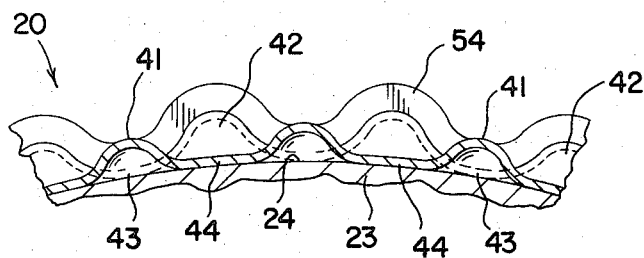
FIG. 4
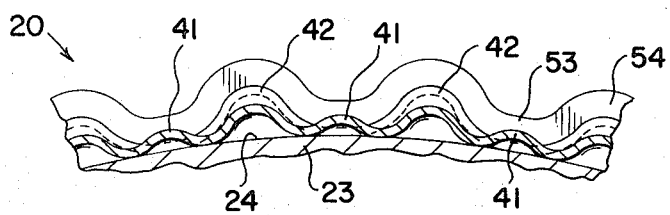
FIG. 5
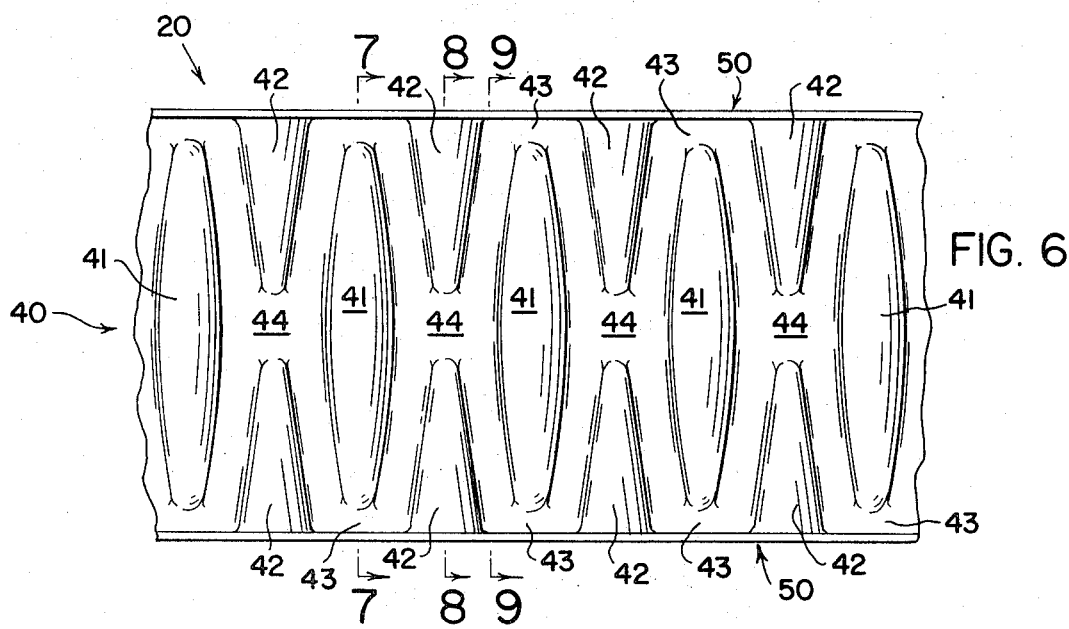
FIG. 6
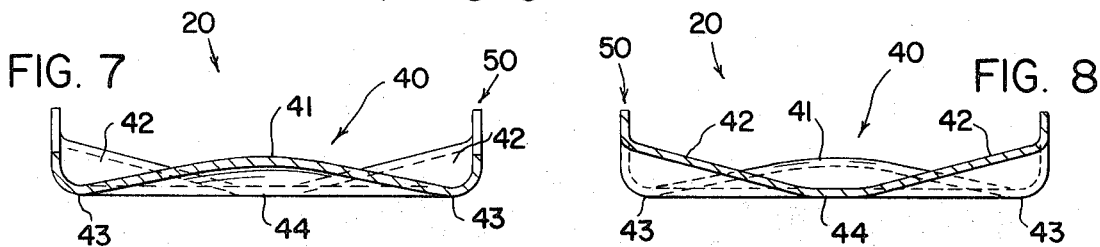
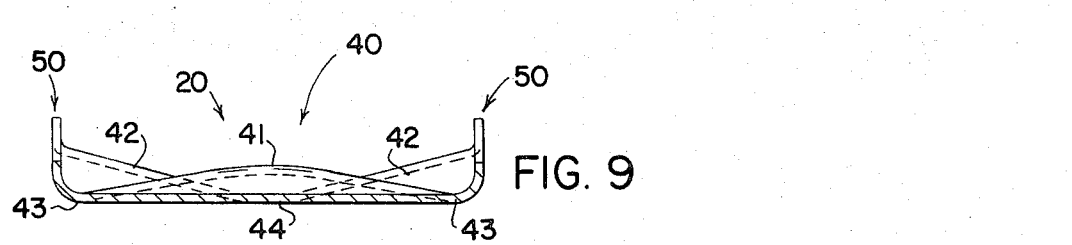

DUAL RIM SPACER

BACKGROUND OF THE INVENTION

The invention relates to improvements in spacers used in mounting dual tire carrying rims on a wheel.

More particularly, the invention relates to a non-compressible or rigid spacer for use in mounting dual rims on a wheel.

The prior art relating to dual rim spacers goes back many years and is attributable to many sources.

U.S. Pat. No. 2,767,026, October/1956, The Dayton Steel Foundry Company, discloses a spacer ring (55) having lateral flanges (56) carried by a non-compressible medial portion. U.S. Pat. No. 3,134,376, August/1964, The Firestone Tire & Rubber Company, discloses a spacer (28) which is described as providing a stronger, lighter-weight spacer than the spacers of the prior art.

It has now been found that the spacers of the prior art may be further improved by providing a light weight and even stronger spacer.

SUMMARY OF THE INVENTION

The object of the invention is to provide an improved non-compressible or rigid spacer for use in mounting dual rims on a wheel.

It is a further object of the invention to provide a spacer which is light weight and stronger than the spacers of the prior art.

These and other objects of the invention, and the advantages thereof, will be apparent in view of the Detailed Description of the Invention, as set forth below.

In general, a spacer according to the invention has an annular medial portion with radially outwardly directed uniformly spaced undulations. The undulations comprise marquise-shaped areas alternating with apexly opposed cone-shaped areas. The radially inner dimensions of the spacer are such that ends of the marquise-shaped areas and the space between the cone-shaped areas will slidingly engage and seat on the felloe, felly or load bearing surface of a wheel for dual rims.

DESCRIPTION OF THE DRAWINGS

FIGS. 4 and 5 are fragmentary axial views of medial portions of a spacer, respectively taken substantially as indicated on line 4—4 and line 5—5 of FIG. 1;

FIG. 6 is a fragmentary plan view of a spacer according to the invention; and

FIGS. 7, 8 and 9 are sectional views of a spacer, respectively taken substantially as indicated on line 7—7, line 8—8 and line 9—9 of FIG. 6.

DETAILED DESCRIPTION OF THE INVENTION

An improved spacer according to the invention is referred to generally by the numeral 20.

Figure 1:
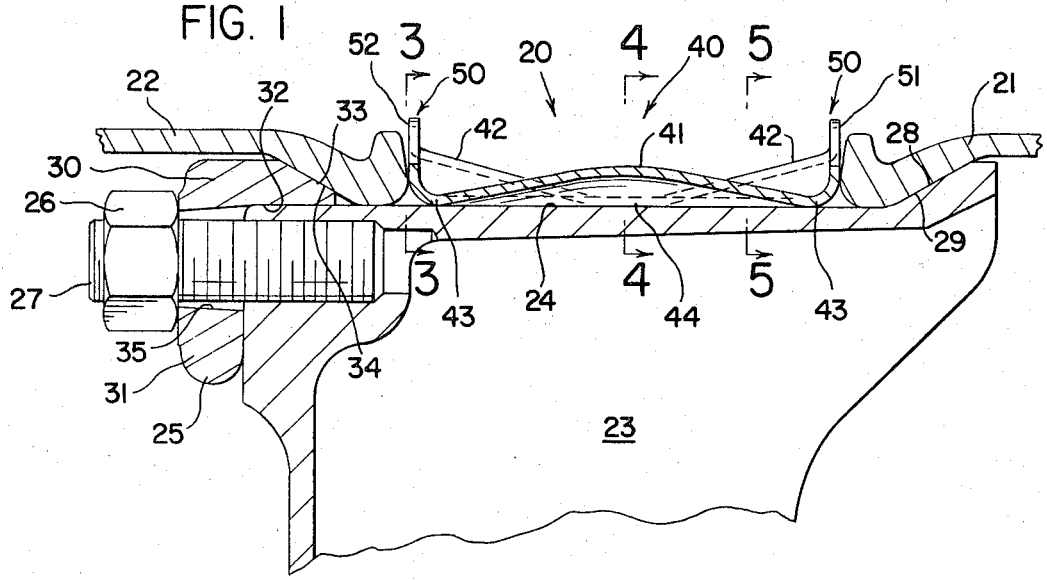
FIG. 1 is a fragmentary sectional view of a spacer according to the invention used in the mounting of dual rims on a wheel.
Figure 2:
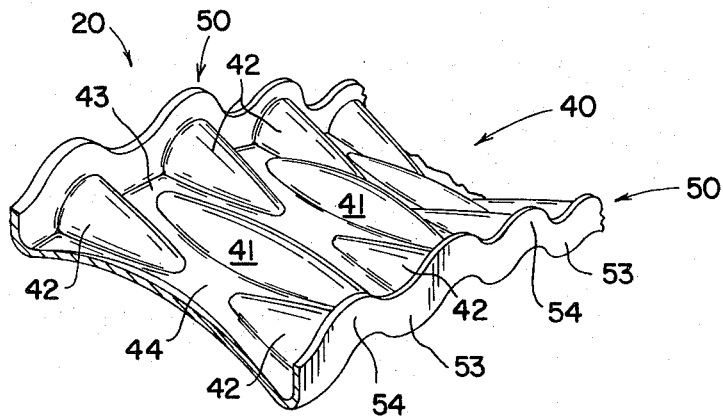
FIG. 2 is a perspective view of a portion or section of a spacer according to the invention.
Figure 3:
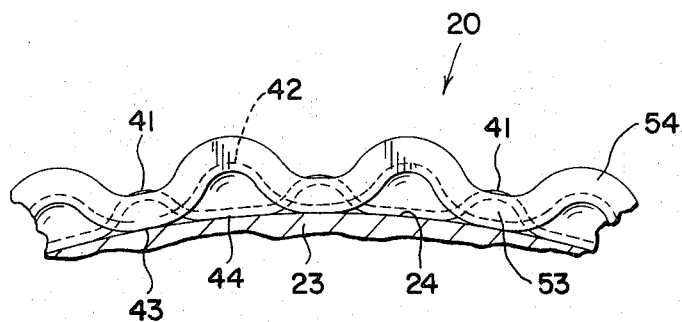
FIG. 3 is a fragmentary axial view of the side of a spacer, taken substantially as indicated on line 3—3 of FIG. 1.

Referring to FIG. 1, a spacer 20 is used between an inner rim 21 and an outer rim 22 to mount dual tires (not shown) on a wheel 23 for attachment to a vehicle axle (not shown). The wheel 23 has a felloe, felly or load bearing surfaces 24. The felly surfaces 24 carry the inner rim 21, the spacer 20 and the outer rim 22 which are secured to the wheel by clamping means such as a clamp lug 25 held by a nut 26 threaded on a bolt 27 extending axially of the wheel adjacent the felly surface.

The felly surfaces 24 terminate at the axially inner end thereof in a standard 28° axially beveled rim mounting surface 28. An inner rim 21 has an axially inclined circumferential mounting flange 29 slidably seated on and carried by the wheel surface 28. The clamp lug 25 has an axially oriented or lateral leg 30 and a radially oriented or upright leg 31. The lateral leg 30 has an arcuate surface 32 on the radially inner side thereof for slidably engaging the felly surfaces 24 and a conical or axially inclined mounting surface 33 for matingly engaging a 28° axially inclined circumferential mounting flange 34 on the outer rim 22. An axial bore 35 through the radial leg 31 receives the stud bolt 27 so that tightening of the nut 26 will move the clamp lug 25 into clamping engagement with the outer rim 22.

A spacer 20 is an annular structure, formed as by precision die stamping of a metal hoop or ring having a predetermined diameter.

A spacer 20 has a medial portion, indicated generally by the numeral 40, with radially outwardly directed uniformly spaced undulations or corrugations. The undulations comprise marquise-shaped areas 41 alternating with apexly opposed cone-shaped areas 42. The radially inner dimensions of the spacer 20 are dependant upon the outer diameter of the felly surfaces 24 of a wheel 23 and are selected so that the ends 43 of the marquise-shaped areas 41 and the space 44 between the cone-shaped areas 42 will slidably engage and seat on the felly surfaces 24 when the spacer 20 is used to mount rims 21 and 22 on the wheel 23.

The spacer 20 also has identical lateral flange or marginal portions, indicated generally by the numeral 50. Each flange portion is formed integrally with the medial portion 40. Each flange portion 50 is radially outwardly directed with axially outer surfaces 51 and 52 for seating against opposed flanges of the rims 21 and 22 when the spacer 20 is used for rim mounting on the wheel 23. Laterally of a marquise-shaped area 41, a flange portion 50 is radially inwardly directed, as indicated at 53. Laterally of a cone-shaped area 42, a flange portion 50 is radially outwardly directed, as indicated at 54. The concave-convex configurations of the flange portions 50 alternate so that each flange portion 50 is sinuous, serpentine or wavy in form.

It has been found that a spacer 20 according to the invention will maintain the accuracy of alignment necessary for the satisfactory mounting of dual rims during all conditions encountered during vehicle operation. The marquise-shaped areas 41 and the cone-shaped areas 42 strengthen and minimize axial deflection of the flange portions 50. The flange portions 50 are high, and being maintained perpendicular to the wheel axis, present a large bearing surface relative to the rims 21 and 22 therefore assuring improved lateral alignment of the rims during mounting on a wheel 23 and during vehicle operation. The interconnected spacer-wheel felly contact areas, 43 and 44, minimize radial deflection, bowing or arcing, of the spacer 20 during rim mounting and during vehicle operation.

The spacer 20 is as light in weight as known spacers and may be formed, for example, from a ring of S.A.E. 1015 steel having a relatively thin thickness such as 0.095 inch.

What is claimed is:

1. A non-compressible spacer for use in mounting dual rims on a vehicle wheel, characterized in that, said spacer has an annular medial portion having a plurality of radially outwardly directed substantially uniformly spaced undulations comprising marquise-shaped areas alternating with apexly opposed cone-shaped areas, the radially inner dimensions of said spacer being such that the space between said marquise-shaped areas and said cone-shaped areas will slidingly engage and seat on the load-bearing surface of a wheel for dual rims.

2. A non-compressible spacer according to claim 1, further characterized in that, lateral flanges formed integrally with said annular medial portion comprise circumferentially undulating flanges directed radially outwardly with axially outer surfaces for seating against opposed flanges of said dual rims, said circumferential undulations being directed radially inwardly laterally of a marquise-shaped area and directed radially outwardly laterally of a cone-shaped area.

* * * * *